United States Patent
Zhao et al.

(10) Patent No.: US 12,438,236 B2
(45) Date of Patent: Oct. 7, 2025

(54) COMPOSITE SEPARATOR INCLUDING FIRE SUPPRESSION LAYER CONTAINING CERAMIC MATERIAL AND CYCLOPHOSPHAZENE AND ELECTROCHEMICAL CELL INCLUDING THE SAME

(71) Applicant: GM GLOBAL TECHNOLOGY OPERATIONS LLC, Detroit, MI (US)

(72) Inventors: Yifan Zhao, Warren, MI (US); Xingcheng Xiao, Troy, MI (US); Shuru Chen, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 612 days.

(21) Appl. No.: 17/877,225

(22) Filed: Jul. 29, 2022

(65) Prior Publication Data

US 2024/0039118 A1    Feb. 1, 2024

(51) Int. Cl.
| | |
|---|---|
| *H01M 50/449* | (2021.01) |
| *C07F 9/576* | (2006.01) |
| *H01M 50/403* | (2021.01) |
| *H01M 50/417* | (2021.01) |
| *H01M 50/491* | (2021.01) |

(52) U.S. Cl.
CPC .......... *H01M 50/449* (2021.01); *C07F 9/576* (2013.01); *H01M 50/403* (2021.01); *H01M 50/417* (2021.01); *H01M 50/491* (2021.01)

(58) Field of Classification Search
CPC ............. H01M 50/449; H01M 50/403; H01M 50/417; H01M 50/491; C07F 9/576
USPC ................................ 429/144, 249, 251, 254
See application file for complete search history.

(56) References Cited

U.S. PATENT DOCUMENTS

2024/0039118 A1    2/2024    Zhao et al.

FOREIGN PATENT DOCUMENTS

| CN | 108822586 A | * | 11/2018 | ............ C09D 1/00 |
| CN | 109461938 A | * | 3/2019 | ............ A62C 37/11 |
| CN | 109980162 A | * | 7/2019 | |
| CN | 117477170 A | | 1/2024 | |
| DE | 102023100908 A1 | | 2/2024 | |

OTHER PUBLICATIONS

Kang et al., Polyacrylonitrile/Phosphazene Composite-Based Heat-Resistant and Flame-Retardant Separators for Safe Lithium-Ion Batteries, Jan. 2022, ACS Applied Energy Materials, 5, 2452-2461 (Year: 2022).*

Xu et al., Multifunctional Lithium-Ion-Exchanged Zeolite-Coated Separator for Lithium-Ion Batteries, Nov. 2018, ACS Applied Energy Materials, 1, 7237-7243 (Year: 2018).*

(Continued)

*Primary Examiner* — Sean P Cullen
(74) *Attorney, Agent, or Firm* — Harness, Dickey & Pierce, P.L.C.

(57) ABSTRACT

A separator for an electrochemical cell that cycles lithium ions includes a microporous layer and one or more fire suppression layers disposed on at least one of a first side or an opposite second side of the microporous layer. The one or more fire suppression layers include a ceramic material having interconnected open pores and a cyclophosphazene disposed within the interconnected open pores of the ceramic material.

20 Claims, 2 Drawing Sheets

(56) References Cited

OTHER PUBLICATIONS

Xuning Feng et al.; "Thermal Runaway Mechanism of Lithium ion Battery for Electric Vehicles: A Review"; Energy Storage Materials 10 (2018); pp. 246-267.
Kai Liu et al.; "Electrospun Core-Shell Microfiber Separator with Thermal-Triggered Flame-Retardant Properties for Lithium-ion Batteries"; Sciences Advances; Jan. 13, 2017; 8 pages.
Shuru Chen et al.; "High-Efficiency Lithium Metal Batteries with Fire-Retardant Electrolytes"; Joule 2; Aug. 15, 2018; pp. 1548-1558.
Ziqi Zeng et al.; "Safer Lithium Ion Batteries Based on Nonflammable Electrolyte"; Journal of Power of Sources 279; (2015); pp. 6-12.
Porous (Definition), Merriam-Webster (downloaded on Jun. 6, 2025), https://www.merriam-webster.com/dictionary/porous.
Yan Wang et al., Preparation and Properties of Novel Crosslinked Polyphosphazene-Aromatic Ethers Organic-Inorganic Hybrid Microspheres, Polymers (2022).
Zhangjun Huang, et al., Water-triggered self-assembly polycondensation for the one-pot synthesis of cyclomatrix polyphosphazene nanoparticles from amino acid ester, Chemical Communications (Apr. 2015).

\* cited by examiner

COMPOSITE SEPARATOR INCLUDING FIRE SUPPRESSION LAYER CONTAINING CERAMIC MATERIAL AND CYCLOPHOSPHAZENE AND ELECTROCHEMICAL CELL INCLUDING THE SAME

INTRODUCTION

This section provides background information related to the present disclosure which is not necessarily prior art.

The present disclosure generally relates to electrochemical cells that cycle lithium ions and, more particularly, to separators for electrochemical cells that cycle lithium ions, wherein the separators exhibit fire suppression capabilities.

Electrochemical cells of secondary lithium batteries generally include a negative electrode and a positive electrode spaced apart from one another by a porous separator. The negative and positive electrodes and the porous separator are infiltrated with a liquid electrolyte that provides a medium for the conduction of lithium ions between the negative and positive electrodes during discharge and recharge of the electrochemical cell. Porous separators of lithium batteries are generally made of ionically conductive and electrically insulating polymers and are oftentimes in the form of a thin membrane or film

Manufacturing defects, aging, and/or certain abuse conditions may impair the thermal stability of secondary lithium batteries. Certain conditions that increase the internal temperature of lithium batteries may set-off undesirable events and/or chemical reactions within the batteries that may lead to further undesirable heat generation. Because components of lithium batteries and/or of their surrounding environment may be flammable, it may be desirable to incorporate materials into the internal components of such batteries that can effectively inhibit propagation of combustion chain reactions.

SUMMARY

This section provides a general summary of the disclosure and is not a comprehensive disclosure of its full scope or all of its features.

The present disclosure relates to a separator for an electrochemical cell that cycles lithium ions. The separator comprises a microporous layer and one or more fire suppression layers. The microporous layer has a first side and an opposite second side. The one or more fire suppression layers are disposed on at least one of the first side or the second side of the microporous layer. The one or more fire suppression layers comprise a ceramic material having interconnected open pores and a cyclophosphazene disposed within the interconnected open pores of the ceramic material.

The cyclophosphazene may be an organophosphorus compound represented by the following chemical formula:

wherein $X^1$, $X^2$, $X^3$, $X^4$, $X^5$, and $X^6$ are each individually a halide, alkoxy group, aryloxy group, or an amino group.

In some aspects, the cyclophosphazene may be phenoxycyclophosphazene.

The ceramic material may comprise alumina, silica, a dehydrated zeolite, or a combination thereof.

The interconnected open pores of the ceramic material may have pore diameters of greater than or equal to about 0.2 nanometers to less than or equal to about 2 nanometers.

The ceramic material may comprise a mordenite-type zeolite having interconnected open pores with pore diameters of greater than or equal to about 2.6 Angstroms to less than or equal to about 7 Angstroms.

The ceramic material may be a powder. In such case, the one or more fire suppression layers may comprise particles of the ceramic material disposed on at least one of the first side or the second side of the microporous layer.

The particles of the ceramic material may have a mean particle diameter of greater than or equal to about 50 nanometers to less than or equal to about 5 micrometers.

The microporous layer may comprise a polyolefin.

Each of the one or more fire suppression layers may have a thickness of greater than or equal to about 100 nanometers to less than or equal to about 20 micrometers.

The ceramic material may constitute, by mass, greater than or equal to about 20% to less than or equal to about 99% of the one or more fire suppression layers.

The cyclophosphazene may constitute, by mass, greater than or equal to about 1% to less than or equal to about 80% of the one or more fire suppression layers.

An electrochemical cell that cycles lithium ions is disclosed. The electrochemical cell comprises a negative electrode, a positive electrode spaced apart from the negative electrode, and a composite separator sandwiched between the negative electrode and the positive electrode. The positive electrode includes a transition metal oxide that can undergo a reversible intercalation of lithium ions. The composite separator comprises a microporous layer having a first side and an opposite second side and one or more fire suppression layers disposed on at least one of the first side or the second side of the microporous layer. The one or more fire suppression layers comprise a ceramic material having interconnected open pores and a cyclophosphazene disposed within the interconnected open pores of the ceramic material.

The cyclophosphazene may be an organophosphorus compound represented by the following chemical formula:

wherein $X^1$, $X^2$, $X^3$, $X^4$, $X^5$, and $X^6$ are each individually a halide, alkoxy group, aryloxy group, or an amino group.

The cyclophosphazene may be phenoxycyclophosphazene.

The ceramic material may comprise alumina, silica, a dehydrated zeolite, or a combination thereof.

The microporous layer may comprise a polyolefin.

The electrochemical may further comprise a liquid electrolyte infiltrating pores of the composite separator and establishing a lithium-ion transport path between the negative electrode and the positive electrode. The liquid electrolyte may comprise a lithium salt dissolved in a nonaqueous organic solvent.

The cyclophosphazene may exhibits a solubility of, by mass, less than or equal to about 1% in the nonaqueous organic solvent.

A method of manufacturing a composite separator for an electrochemical cell that cycles lithium ions is disclosed. In the method, cyclophosphazene molecules are introduced into interconnected open pores of a ceramic material. The ceramic material is deposited on at least one of a first side or an opposite second side of a microporous layer.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The drawings described herein are for illustrative purposes only of selected embodiments and not all possible implementations and are not intended to limit the scope of the present disclosure.

Corresponding reference numerals indicate corresponding parts throughout the several views of the drawings.

DETAILED DESCRIPTION

Example embodiments are provided so that this disclosure will be thorough, and will fully convey the scope to those who are skilled in the art. Numerous specific details are set forth such as examples of specific compositions, components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, elements, compositions, steps, integers, operations, and/or components, but do not preclude the presence or addition of one or more other features, integers, steps, operations, elements, components, and/or groups thereof. Although the open-ended terms "comprises," "comprising," "including," and "having," are to be understood as non-restrictive terms used to describe and claim various embodiments set forth herein, in certain aspects, the terms may alternatively be understood to instead be a more limiting and restrictive term, such as "consisting of" or "consisting essentially of." Thus, for any given embodiment reciting compositions, materials, components, elements, ingredients, features, integers, operations, and/or process steps, the present disclosure also specifically includes embodiments consisting of, or consisting essentially of, such recited compositions, materials, components, elements, ingredients, features, integers, operations, and/or process steps. In the case of "consisting of," the alternative embodiment excludes any additional compositions, materials, components, elements, ingredients, features, integers, operations, and/or process steps, while in the case of "consisting essentially of," any additional compositions, materials, components, elements, ingredients, features, integers, operations, and/or process steps that materially affect the basic and novel characteristics are excluded from such an embodiment, but any compositions, materials, components, elements, ingredients, features, integers, operations, and/or process steps that do not materially affect the basic and novel characteristics can be included in the embodiment.

Any method steps, processes, and operations described herein are not to be construed as necessarily requiring their performance in the order discussed or illustrated, unless specifically identified as an order of performance. It is also to be understood that additional or alternative steps may be employed, unless otherwise indicated.

When a component, element, or layer is referred to as being "on," "engaged to," "connected to," or "coupled to" another element or layer, it may be directly on, engaged, connected or coupled to the other component, element, or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes combinations of one or more of the associated listed items.

Although the terms first, second, third, etc. may be used herein to describe various steps, elements, components, regions, layers and/or sections, these steps, elements, components, regions, layers and/or sections should not be limited by these terms, unless otherwise indicated. These terms may be only used to distinguish one step, element, component, region, layer or section from another step, element, component, region, layer, or section. Terms such as "first," "second," and other numerical terms when used herein do not imply a sequence or order unless clearly indicated by the context. Thus, a first step, element, component, region, layer, or section discussed below could be termed a second step, element, component, region, layer, or section without departing from the teachings of the example embodiments.

Spatially or temporally relative terms, such as "before," "after," "inner," "outer," "beneath," "below," "lower," "above," "upper," and the like, may be used herein for ease of description to describe one element or feature's relationship to another element(s) or feature(s), as illustrated in the figures. Spatially or temporally relative terms may be intended to encompass different orientations of the device or system in use or operation in addition to the orientation depicted in the figures.

Throughout this disclosure, the numerical values represent approximate measures or limits to ranges and encompass minor deviations from the given values and embodiments, having about the value mentioned as well as those having exactly the value mentioned. Other than the working examples provided at the end of the detailed description, all numerical values of parameters (e.g., of quantities or conditions) in this specification, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. For example, "about" may comprise a variation of less than or equal to 5%, optionally less than or equal to 4%, optionally less than or equal to 3%, optionally less than or equal to 2%, optionally less than or equal to 1%, optionally less than or equal to 0.5%, and in certain aspects, optionally less than or equal to 0.1%.

In addition, disclosure of ranges includes disclosure of all values and further divided ranges within the entire range, including endpoints and sub-ranges given for the ranges.

As used herein, the terms "composition" and "material" are used interchangeably to refer broadly to a substance containing at least the preferred chemical constituents, elements, or compounds, but which may also comprise additional elements, compounds, or substances, including trace amounts of impurities, unless otherwise indicated. An "X-based" composition or material broadly refers to compositions or materials in which "X" is the single largest constituent of the composition or material on a weight percentage (%) basis. This may include compositions or materials having, by weight, greater than 50% X, as well as those having, by weight, less than 50% X, so long as X is the single largest constituent of the composition or material based upon its overall weight.

The term "battery" means a device that includes multiple interconnected electrochemical cells (battery cells) arranged in series and/or parallel and may refer to battery cells that are grouped together in the form of battery modules and/or battery packs.

Example embodiments will now be described more fully with reference to the accompanying drawings.

The presently disclosed composite separators are formulated for use in electrochemical cells that cycle lithium ions to help prevent or inhibit propagation of combustion chain reactions with the electrochemical cells. The composite separators include a microporous layer and one or more fire suppression layers disposed on at least one of a first side or an opposite second side of the microporous layer. The one or more fire suppression layers comprises a ceramic material having interconnected open pores and a cyclophosphazene disposed within the interconnected open pores of the ceramic material. The cyclophosphazene can effectively quench, suppress, and/or terminate combustion chain reactions when exposed to thermal runaway temperatures.

Figure 1:
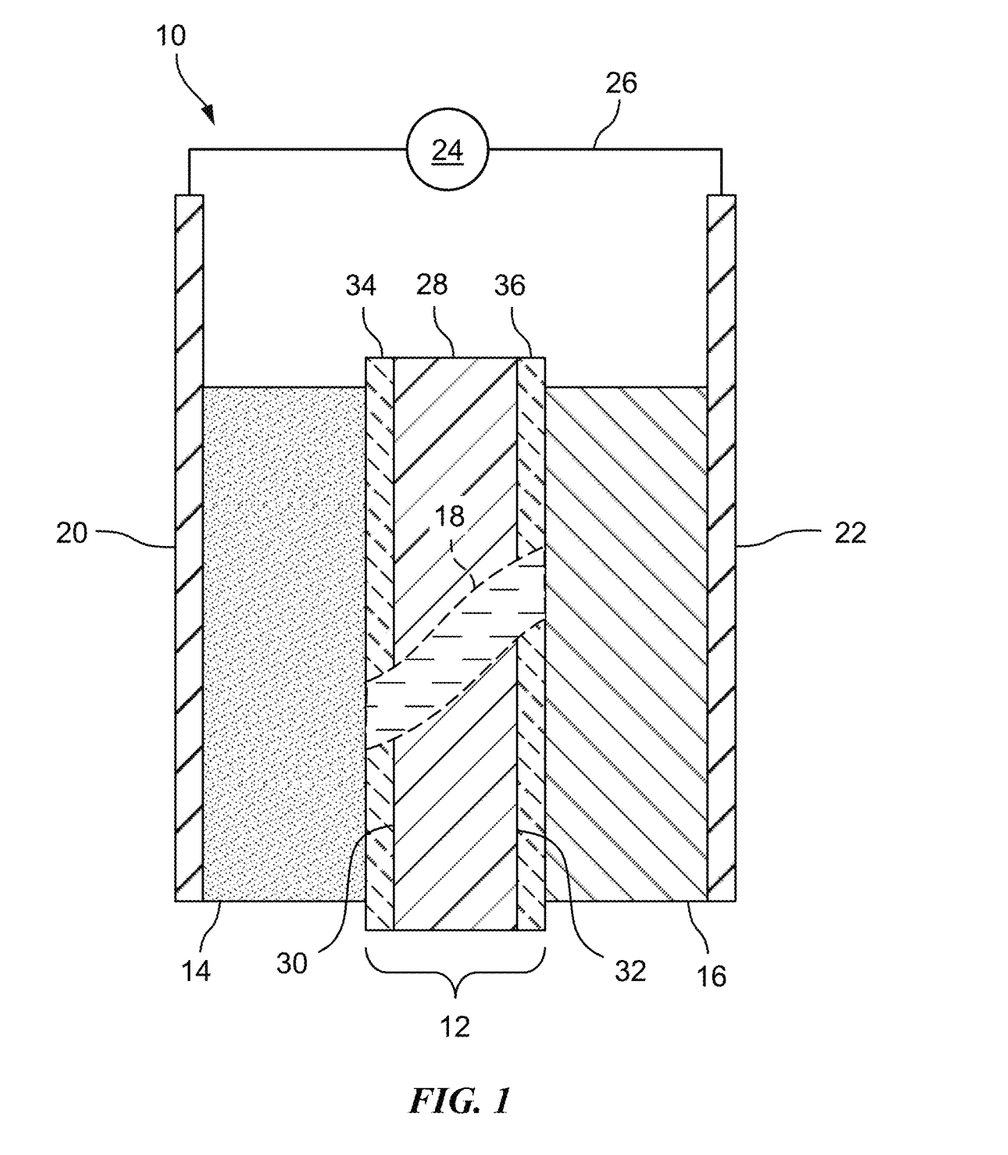
FIG. 1 is a schematic side cross-sectional view of an electrochemical cell that cycles lithium ions, wherein the electrochemical cell includes a composite separator sandwiched between a negative electrode and a positive electrode and a liquid electrolyte infiltrating pores of the composite separator.

FIG. 1 depicts a schematic side cross-sectional view of an electrochemical cell 10 that cycles lithium ions. The electrochemical cell 10 may be combined with one or more additional electrochemical cells to form a secondary lithium battery, such as a lithium-ion battery or a lithium metal battery. The electrochemical cell 10 includes a composite separator 12 sandwiched between a positive electrode 14 and a negative electrode 16. The composite separator 12 is infiltrated with a liquid electrolyte 18 that provides a medium for the conduction of lithium ions between the positive electrode 14 and the negative electrode 16. The positive electrode 14 is disposed on a major surface of a positive electrode current collector 20, and the negative electrode 16 is disposed on a major surface of a negative electrode current collector 22. In practice, the positive and negative electrode current collectors 20, 22 may be electrically coupled to a power source or load 24 via an external circuit 26.

Figure 2:
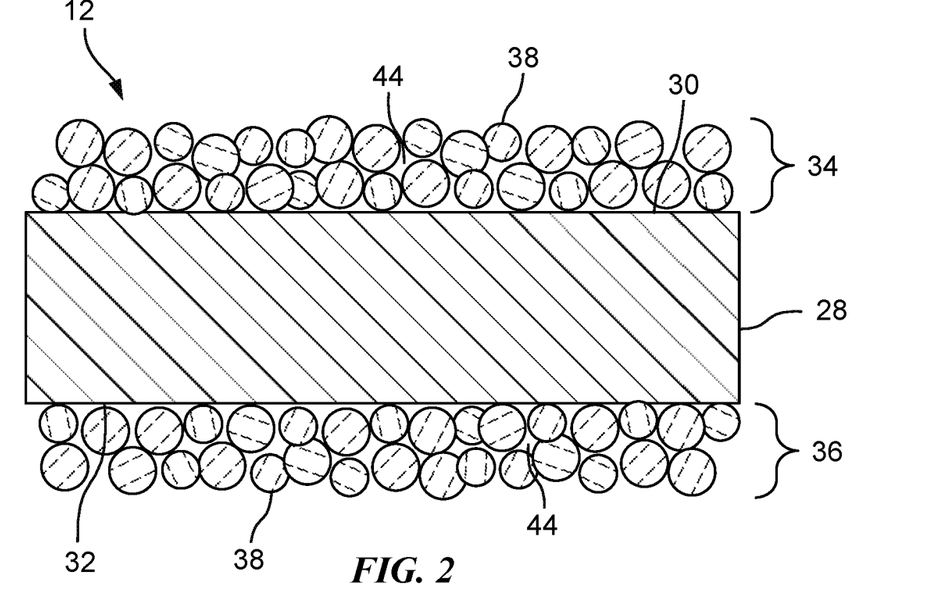
FIG. 2 a schematic side cross-sectional view of the composite separator of FIG. 1, wherein the composite separator includes first and second fire suppression layers disposed on opposite first and second sides of a microporous layer, and wherein each of the first and second fire suppression layers include ceramic material particles.

The composite separator 12 physically and electrically isolates the positive electrode 14 and the negative electrode 16 from each other while allowing lithium ions to pass therethrough. As shown in FIGS. 1 and 2, the composite separator 12 comprises a microporous layer 28, having a first side 30 and an opposite second side 32, and at least one fire suppression layer disposed on the first side 30 and/or the second side 32 of the microporous layer 28. The first side 30 of the microporous layer 28 faces toward the positive electrode 14 and the second side 32 of the microporous layer 28 faces toward the negative electrode 16. The composite separator 12 depicted in FIGS. 1 and 2 includes a first fire suppression layer 34 disposed on the first side 30 of the microporous layer 28 and a second fire suppression layer 36 disposed on the second side 32 of the porous microporous layer 28. The first fire suppression layer 34 may be disposed directly on a surface of the microporous layer 28 defined by the first side 30 thereof and the second fire suppression layer 36 may be disposed directly on a surface of the microporous layer 28 defined by the second side 32 thereof.

The microporous layer 28 exhibits an open microporous structure and may comprise one or more ionically conductive and electrically insulating polymers. The microporous layer 28 may be in the form of a continuous membrane or film, or the microporous layer 28 may comprise a discontinuous non-woven material, e.g., a manufactured sheet, web, or mat of directionally or randomly oriented fibers. Examples of ionically conductive and electrically insulating polymers include polyolefins, e.g., polyethylene (PE), polypropylene (PP), polyethylene terephthalate (PET), polyamide (PA), poly(tetrafluoroethylene) (PTFE), polyvinylidene fluoride (PVdF), and/or poly(vinyl chloride) (PVC). The microporous layer 28 may comprise a single polymer or a combination of polymers. In some aspects, the microporous layer 28 may comprise a laminate of one or more polymers, e.g., a laminate of PE, PP, and/or PET. The microporous layer 28 may have a thickness of greater than or equal to about 100 nanometers or about 5 micrometers to less than or equal to about 30 micrometers or about 20 micrometers and a porosity of greater than or equal to about 25% to less than or equal to about 75%.

The fire suppression layers 34, 36 are configured to provide the composite separator 12 with mechanical integrity and thermal stability at high temperatures (e.g., temperatures greater than or equal to about 150° C.), and to help prevent or inhibit the propagation of combustion chain reactions within the electrochemical cell 10 during a thermal runaway event. The fire suppression layers 34, 36 may have a thickness of greater than or equal to about 100 nanometers or about 1 micrometer to less than or equal to about 20 micrometers and a porosity of greater than or equal to about 20% to less than or equal to about 80%.

The fire suppression layers 34, 36 may comprise, consist essentially of, or consist of a ceramic material having interconnected open pores and a cyclophosphazene disposed within the interconnected open pores of the ceramic material. The ceramic material may constitute, by mass, greater than or equal to about 20% to less than or equal to about 99% of the fire suppression layers 34, 36 and the cyclophosphazene may constitute, by mass, greater than or equal to about 1% to less than or equal to about 80% of the fire suppression layers 34, 36.

The ceramic material is configured to receive and store molecules of the cyclophosphazene within its interconnected open pores and to provide the fire suppression layers 34, 36 with high mechanical strength and thermal stability. As such, at least some of the interconnected open pores of the ceramic material may have pore diameters that are sized to receive the molecules of the cyclophosphazene. In aspects, the ceramic material may have interconnected open pores with pore diameters of greater than or equal to about 0.2 nanometers to less than or equal to about 2 nanometers.

The ceramic material may comprise an inorganic material that exhibits high mechanical strength, thermal stability, and is chemically nonreactive with other components of the electrochemical cell 10 (e.g., the positive and negative electrodes 14, 16 and the electrolyte 18). In aspects, the ceramic material may comprise, consist essentially of, or consist of alumina ($Al_2O_3$), silica ($SiO_2$), and/or a dehydrated natural or synthetic zeolite. Zeolites are porous crystalline aluminosilicate materials comprising a three-dimensional framework of $AlO_2$ and $SiO_2$ tetrahedral units and extra-framework cations. Each $AlO_2$ unit introduces one negative charge to the framework, which is offset by the extra-framework cations. The extra-framework cations may be organic or inorganic in nature. The ceramic material may comprise a zeolite having a three-dimensional framework of $AlO_2$ and $SiO_2$ tetrahedral units and extra-framework lithium cations ($Li^+$). The zeolite may be substantially free of the following extra-framework cations: $Na^+$ and $H^+$.

Zeolite materials may be categorized based upon the crystalline structure of their corner-sharing network of tetrahedrally coordinated atoms or T-atoms (e.g., Si and Al). Zeolite crystal structures are typically described or defined by reference to a framework type code consisting of three capital letters and assigned by the International Zeolite Association ("IZA"). A listing of all framework type codes assigned by the IZA can be found in the Atlas of Zeolite Framework Types, Sixth Revised Edition, Elsevier (2007). Examples of zeolite framework types for the ceramic material include: mordenite (MOR) having open pores defined by 12-ring channels with pore diameters of greater than or equal to about 6.5 Angstroms to less than or equal to about 7 Angstroms and open pores defined by 8-ring channels with pore diameters of greater than or equal to about 2.6 Angstroms to less than or equal to about 5.7 Angstroms.

The cyclophosphazene is configured to quench, suppress, and/or terminate combustion chain reactions that may occur in the electrochemical cell 10 during a thermal runaway event. Without intending to be bound by theory, it is believed that, when the cyclophosphazene is exposed to relatively high temperatures (e.g., temperatures greater than about 150° C.), the cyclophosphazene may thermally decompose and produce gaseous chemical compounds or species that effectively quench, remove, or interfere with free radical-initiated combustion chain reactions occurring within the electrochemical cell 10. In addition, the cyclophosphazene is configured such that individual molecules of the cyclophosphazene can be received in and stored within the interconnected open pores of the ceramic material. In some aspects, individual molecules of the cyclophosphazene may have molecular diameters of less than or equal to about 2 nanometers. For example, individual molecules of the cyclophosphazene may have molecular diameters of greater than or equal to about 0.5 nanometers to less than or equal to about 2 nanometers.

The cyclophosphazene is formulated to be substantially chemically nonreactive with and insoluble (or having very low solubility) in the liquid electrolyte 18. For example, the cyclophosphazene may exhibit a solubility of, by weight, less than or equal to about 1% in the one or more nonaqueous organic solvents (e.g., in the one or more organic carbonates and/or aliphatic carboxylic esters) included in the liquid electrolyte 18. Without intending to be bound by theory, it is believed that the low solubility of the cyclophosphazene in the liquid electrolyte 18 may allow the cyclophosphazene to be included in the electrochemical cell 10 without negatively impacting the performance or cycle life of the electrochemical cell 10. In addition, due to the low solubility of the cyclophosphazene in the liquid electrolyte 18, the cyclophosphazene may remain in the interconnected open pores of the ceramic material during normal operation of the electrochemical cell 10, which may help prevent or inhibit the cyclophosphazene from interacting with (e.g., chemically reacting with) other components of the electrochemical cell 10.

The cyclophosphazene may be an organophosphorus compound including a 6-membered ring of alternating phosphorus and nitrogen atoms with alternating single and double bonds therebetween. For example, the cyclophosphazene may comprise an organophosphorus compound represented by the following chemical formula:

(1)

where $X^1$, $X^2$, $X^3$, $X^4$, $X^5$, and $X^6$ are each individually a halide (e.g., F, Cl, Br, and/or I), an alkoxy group (—O—R), and/or an amino group (—NR'R"), where R, R', and R" are each individually C1-C4 alkyl groups or aryl groups having 5 to 6 carbon atoms. Examples of C1-C4 alkyl groups include methyl groups (—$CH_3$) and ethyl groups (—$CH_2CH_3$). Examples of aryl groups having 5 to 6 carbon atoms include phenyl groups (—$C_6H_5$) and benzyl groups (—$C_6H_5CH_2$).

In aspects, each of $X^1$, $X^2$, $X^3$, $X^4$, $X^5$, and $X^6$ in the organophosphorus compound of formula (1) may be a phenoxy group (i.e., —$OC_6H_5$). In such case, the cyclophosphazene may comprise phenoxycyclophosphazene, CAS No. 1184-10-7, and may be represented by the following chemical formula:

(2)

Figure 3:
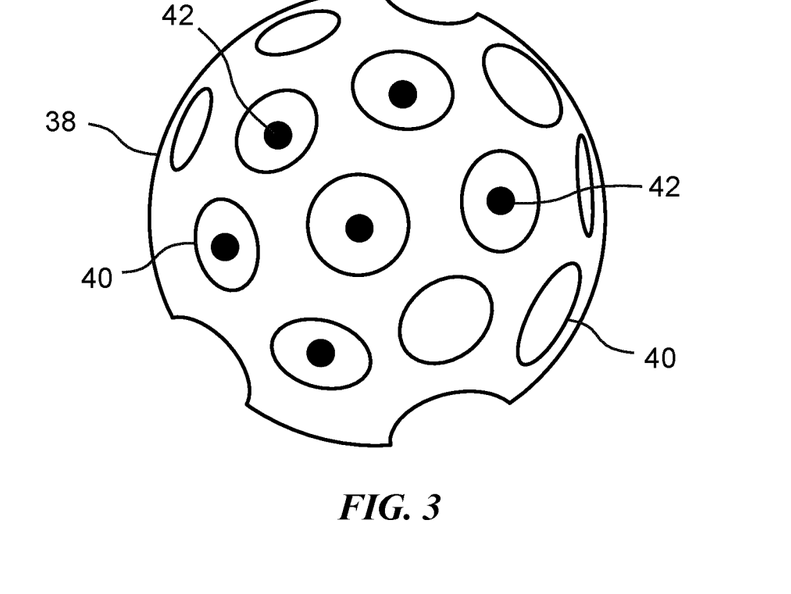
FIG. 3 is a schematic perspective view of one of the ceramic material particles of FIG. 2, wherein each of the ceramic material particles has interconnected open pores and one or more cyclophosphazene molecules disposed within the interconnected open pores thereof.

As shown in FIG. 2, in some aspects, the ceramic material may be in the form of a powder and the fire suppression layers 34, 36 may comprise ceramic material particles 38. The first fire suppression layer 34 may comprise ceramic material particles 38 disposed on the first side 30 of the microporous layer 28 and the second fire suppression layer 36 may comprise ceramic material particles 38 disposed on the second side 32 of the microporous layer 28. As shown in FIG. 3, the ceramic material particles 38 may have interconnected open pores 40 and cyclophosphazene molecules 42 may be disposed within the interconnected open pores 40 of the ceramic material particles 38. In some aspects, the ceramic material particles 38 may be arranged on the first side 30 and/or the second side 32 of the microporous layer 28 such that interstitial voids 44 exist between at least some of the ceramic material particles 38. In practice, the interstitial voids 44 defined between the ceramic material particles 38 may be infiltrated with the liquid electrolyte 18. The ceramic material particles 38 may have a mean particle diameter of greater than or equal to about 50 nanometers to less than or equal to about 5 micrometers.

The positive electrode 14 is porous and may comprise one or more electrochemically active positive electrode materials that can undergo a reversible redox reaction with lithium, e.g., a material that can sufficiently undergo lithium intercalation and deintercalation, alloying and dealloying, or plating and stripping. In one form, the positive electrode 14 may comprise an intercalation host material that can undergo the reversible insertion or intercalation of lithium ions. In such case, the intercalation host material of the positive electrode 14 may comprise a layered oxide represented by the formula $LiMeO_2$, an olivine-type oxide represented by the formula $LiMePO_4$, a spinel-type oxide represented by the formula $LiMe_2O_4$, a tavorite represented by one or both of the following formulas $LiMeSO_4F$ or $LiMePO_{4F}$, or a combination thereof, where Me is a transition metal (e.g., Co, Ni, Mn, Fe, Al, V, or a combination thereof). In another form, the positive electrode 14 may comprise a conversion material including a component that can undergo a reversible electrochemical reaction with lithium, in which the component undergoes a phase change or a change in crystalline structure accompanied by a change in oxidation state. In such case, the conversion material of the positive electrode 14 may comprise sulfur, selenium, tellurium, iodine, a halide (e.g., a fluoride or chloride), sulfide, selenide, telluride, iodide, phosphide, nitride, oxide, oxysulfide, oxyfluoride, sulfur-fluoride, sulfur-oxyfluoride, or a lithium and/or metal compound thereof. Examples of metals for inclusion in the conversion material of the positive electrode 14 include iron, manganese, nickel, copper, and cobalt. The electrochemically active positive electrode material of the positive electrode 14 may be intermingled with a polymeric binder to provide the positive electrode 14 with structural integrity. Examples of polymeric binders include polyvinylidene fluoride (PVdF), ethylene propylene diene monomer (EPDM) rubber, styrene butadiene rubber (SBR), carboxymethyl cellulose (CMC), polyacrylic acid, and mixtures thereof. The positive electrode 14 optionally may include particles of an electrically conductive material, which may comprise very fine particles of, for example, high-surface area carbon black.

The negative electrode 16 is spaced apart from the positive electrode 14 by the composite separator 12. The negative electrode 16 may be porous or nonporous. In some aspects, the negative electrode 16 may comprise, consist essentially of, or consist of lithium (Li) metal. For example, in some aspects, the negative electrode 16 may comprise, by weight, greater than 97% lithium or greater than 99% lithium and may be substantially free of elements or compounds that undergo a reversible redox reaction with lithium during operation of the electrochemical cell 10. In other aspects, the negative electrode 16 may comprise an electrochemically active negative electrode material that can undergo the reversible insertion or intercalation of lithium ions or that can react with lithium to form a lithium-containing intermetallic compound. The electrochemically active negative electrode material of the negative electrode 16 may comprise a silicon-based material, a carbon-based material (e.g., graphite, activated carbon, carbon black, and/or graphene), tin oxide, aluminum, indium, zinc, germanium, titanium oxide, and/or lithium titanate. The electrochemically active negative electrode material of the negative electrode 16 may intermingled with the same polymeric binder(s) and/or the same electrically conductive material particles as that of the positive electrode 14.

The liquid electrolyte 18 infiltrates the pores of the composite separator 12 and the positive electrode 14 and is in physical and ionic contact with the negative electrode 16. In aspects where the negative electrode 16 is porous, the electrolyte 18 may infiltrate the pores of the composite separator 12, the positive electrode 14, and the negative electrode 16. The electrolyte 18 is formulated to facilitate the transport of lithium ions between the positive electrode 14 and the negative electrode 16 during cycling of the electrochemical cell 10. The liquid electrolyte 18 may be in the form of a solution and may comprise one or more lithium salts dissolved in a nonaqueous aprotic organic solvent or a mixture of nonaqueous aprotic organic solvents. Examples of lithium salts include lithium hexafluorophosphate ($LiPF_6$), lithium perchlorate ($LiClO_4$), lithium tetrachloroaluminate ($LiAlCl_4$), lithium iodide (LiI), lithium bromide (LiBr), lithium thiocyanate (LiSCN), lithium tetrafluoroborate ($LiBF_4$), lithium tetraphenylborate ($LiB(C_6H_5)_4$), lithium bis(oxalato)borate ($LiB(C_2O_4)_2$) (LiBOB), lithium difluorooxalatoborate ($LiBF_2(C_2O_4)$), lithium hexafluoroarsenate ($LiAsF_6$), lithium trifluoromethanesulfonate ($LiCF_3SO_3$), lithium bis(trifluoromethane)sulfonylimide ($LiN(CF_3SO_2)_2$), lithium bis(fluorosulfonyl)imide (LiN$(FSO_2)_2$) (LiSFI), and combinations thereof. Examples of nonaqueous aprotic organic solvents include organic carbonates, for example, cyclic carbonates (e.g., ethylene carbonate (EC), propylene carbonate (PC), butylene carbonate (BC), fluoroethylene carbonate (FEC)), linear carbonates (e.g., dimethyl carbonate (DMC), diethyl carbonate (DEC), ethylmethylcarbonate (EMC)), aliphatic carboxylic esters (e.g., methyl formate, methyl acetate, methyl propionate), γ-lactones (e.g., γ-butyrolactone, γ-valerolactone), chain structure ethers (e.g., 1,2-dimethoxyethane, 1-2-diethoxyethane, ethoxymethoxyethane), cyclic ethers (e.g., tetrahydrofuran, 2-methyltetrahydrofuran), 1,3-dioxolane), sulfur compounds (e.g., sulfolane), and combinations thereof.

The positive and negative electrode current collectors 20, 22 may be in the form of thin and flexible porous or non-porous electrically conductive metal substrates. Each of the positive and negative electrode current collectors 20, 22 may comprise a metal that is capable of collecting and reversibly passing free electrons to and from their respective electrodes 14, 16. The term "metal," as used herein with respect to the positive and negative electrode current collectors 20, 22, may refer to a pure elemental metal or to a combination (e.g., an alloy) of an elemental metal and one or more other metal or nonmetal elements. For example, the positive and negative electrode current collectors 20, 22 may comprise or consist of a transition metal. In aspects, the positive electrode current collector 20 may comprise aluminum (Al), nickel (Ni), or an iron (Fe) alloy (e.g., stainless steel) and the negative electrode current collector 22 may comprise copper (Cu), nickel (Ni), an iron (Fe) alloy (e.g., stainless steel), or titanium (Ti). Other electrically conductive metals may of course be used, if desired.

In a method of manufacturing the composite separator 12, cyclophosphazene molecules may be introduced into the interconnected open pores of the ceramic material prior to or after particles of the ceramic material are deposited on the first side 30 and/or the second side 32 of the microporous layer 28.

In some aspects, cyclophosphazene molecules may be introduced into the interconnected open pores of the ceramic material by applying a cyclophosphazene-containing solution to the ceramic material such that the cyclophosphazene-containing solution infiltrates the interconnected open pores of the ceramic material. The cyclophosphazene-containing solution may be applied to the ceramic material, for example, by immersing the ceramic material in the cyclophosphazene-containing solution. The cyclophosphazene-containing solution may comprise a cyclophosphazene dissolved in an organic solvent. The organic solvent may comprise tetrahydrofuran (THF), N-methylpyrrolidone (NMP), or a combination thereof. The cyclophosphazene may be dissolved in the organic solvent at concentration of greater than or equal to about 0.1 moles per liter to less than or equal to about 1.0 moles per liter. After the cyclophosphazene-containing solution has been introduced into the interconnected open pores of the ceramic material, the organic solvent may be removed from the cyclophosphazene-containing solution such that molecules of the cyclophosphazene are deposited within the interconnected open pores of the ceramic material. The organic solvent may be removed from the cyclophosphazene-containing solution by evaporation. The organic solvent may be evaporated from the ceramic material by heating the ceramic material under vacuum.

In other aspects, cyclophosphazene molecules may be introduced into the interconnected open pores of the ceramic material by forming a mixture of solid phase particles of the cyclophosphazene and the ceramic material, and then heating the mixture at a temperature of greater than or equal to about 150° C. to melt the cyclophosphazene such that the liquid phase cyclophosphazene flows into the interconnected open pores of the ceramic material. Thereafter, an organic solvent (e.g., THF and/or NMP) may be used to wash excess cyclophosphazene off the exterior surfaces of the ceramic material.

Before or after the cyclophosphazene molecules are introduced into the interconnected open pores of the ceramic material, particles of the ceramic material may be deposited on the first side 30 and/or the second side 32 of the microporous layer 28 in the form of a suspension oftentimes referred to as a slurry. The slurry may comprise the ceramic material particles, a solvent, and optionally a binder. The solvent may be aqueous (e.g., water) or nonaqueous (e.g., an organic solvent). The binder may comprise a polymeric material, e.g., polyvinylidene fluoride (PVdF), ethylene propylene diene monomer (EPDM) rubber, styrene butadiene rubber (SBR), carboxymethyl cellulose (CMC), polyacrylic acid, or a combination thereof. After the slurry is applied to the first side 30 and/or the second side 32 of the microporous layer 28, the solvent may be removed from the slurry, e.g., by evaporation, to form the first and second fire suppression layers 34, 36 respectively on the first side 30 and/or the second side 32 of the microporous layer 28.

EXPERIMENTAL

Zeolite coated separators including a polymer membrane having lithium ion exchanged zeolite (LiZ) particles deposited on opposite first and second sides thereof were obtained from PIDC of Ann Arbor, MI. The polymer membrane was made of a laminate of PP/PE/PP and had a thickness of 20 µm. The LiZ particles were of the Y (FAU) zeolite framework type and had a mean particle diameter in the range of 50 nm to 5 µm. The LiZ particles were coated on the first and second sides of the polymer membrane at thicknesses of about 10 µm. A group (Group A) of the LiZ-coated separators were soaked in a solution including phenoxycyclophosphazene (HPCTP) dissolved in tetrahydrofuran at a concentration of 0.5 Molar to form HPCTP-LiZ-coated separators. For comparison, a second group (Group B) of the LiZ-coated separators were soaked in tetrahydrofuran (THF). After soaking, the THF was removed from the separators by drying under vacuum at a temperature of about 30° C. for about 10 hours.

The Group A and Group B separators were incorporated into electrochemical cells including lithium metal anodes (30 µm Li foil), NMC622 cathodes (3.75 mAh/cm$^2$), and a FEC/DMC+LiPF$_6$ liquid electrolyte (30 µL). The Group A separators contained about 1.2 milligrams of HPCTP each.

Impedance measurements performed on the cells including the Group A and Group B separators indicate that impregnating the LiZ particles of the LiZ-coated separators with HPCTP can reduce cell impedance by about 20%, as compared to the LiZ-coated separators that were soaked in pure THF (without HPCTP).

The areal capacity (mAh/cm$^2$) of the as-prepared electrochemical cells was measured by cycling the cells between voltages of 3V to 4.3V at a C/10 charge/discharge rate for the first two cycles, followed by charging at a C/5 charge rate and discharging at a C/2 discharge rate for an additional 60-70 cycles. The areal capacity measurements indicate that cells including the Group A separators exhibit substantially the same areal capacity during the first 60 cycles as cells including the Group A separators. This indicates that impregnating the LiZ particles of the LiZ-coated separators with HPCTP does not have a negative impact on cycle life.

The foregoing description of the embodiments has been provided for purposes of illustration and description. It is not intended to be exhaustive or to limit the disclosure. Individual elements or features of a particular embodiment are generally not limited to that embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A separator for an electrochemical cell that cycles lithium ions, the separator comprising:
a microporous layer having a first side and an opposite second side; and
one or more fire suppression layers disposed on at least one of the first side or the second side of the microporous layer, the one or more fire suppression layers comprising: (i) ceramic material particles, with each of the ceramic material particles being porous and having interconnected open pores, and (ii) individual cyclophosphazene molecules disposed within the interconnected open pores of the ceramic material particles,
wherein the interconnected open pores of the ceramic material particles are sized to receive the individual cyclophosphazene molecules.

2. The separator of claim 1, wherein the individual cyclophosphazene molecules comprise organophosphorus compounds represented by the chemical formula:

wherein $X^1$, $X^2$, $X^3$, $X^4$, $X^5$, and $X^6$ are each individually a halide, alkoxy group, aryloxy group, or an amino group.

3. The separator of claim 1, wherein the individual cyclophosphazene molecules comprise phenoxycyclophosphazene.

4. The separator of claim 1, wherein the individual cyclophosphazene molecules have molecular diameters of greater than or equal to 0.5 nanometers and less than or equal to 2 nanometers.

5. The separator of claim 1, wherein the ceramic material particles comprise particles of alumina, silica, a dehydrated zeolite, or a combination thereof.

6. The separator of claim 1, wherein the interconnected open pores of the ceramic material particles have pore diameters of greater than or equal to about 0.2 nanometers to less than or equal to about 2 nanometers.

7. The separator of claim 1, wherein the ceramic material particles comprise particles of mordenite, and wherein the interconnected open pores of the ceramic material particles have pore diameters of greater than or equal to about 2.6 Angstroms to less than or equal to about 7 Angstroms.

8. The separator of claim 1, wherein the ceramic material particles have a mean particle diameter of greater than or equal to about 50 nanometers to less than or equal to about 5 micrometers.

9. The separator of claim 1, wherein the microporous layer comprises a polyolefin.

10. The separator of claim 1,
wherein each of the one or more fire suppression layers has a thickness of greater than or equal to about 100 nanometers to less than or equal to about 20 micrometers,
wherein the ceramic material particles constitute, by mass, greater than or equal to about 20% to less than or equal to about 99% of the one or more fire suppression layers, and
wherein the cyclophosphazene molecules constitute, by mass, greater than or equal to about 1% to less than or equal to about 80% of the one or more fire suppression layers.

11. An electrochemical cell that cycles lithium ions, the electrochemical cell comprising:
a negative electrode;
a positive electrode spaced apart from the negative electrode, the positive electrode including a transition metal oxide that can undergo a reversible intercalation of lithium ions;
a composite separator sandwiched between the negative electrode and the positive electrode, the composite separator being porous and comprising:
a microporous layer having a first side and an opposite second side, and
one or more fire suppression layers disposed on at least one of the first side or the second side of the microporous layer, the one or more fire suppression layers comprising: (i) ceramic material particles, with each of the ceramic material particles being porous and having a interconnected open pores, and (ii) individual cyclophosphazene molecules disposed within the interconnected open pores of the ceramic material particles,
wherein the interconnected open pores of the ceramic material particles are sized to receive the individual cyclophosphazene molecules.

12. The electrochemical cell of claim 11, wherein the individual cyclophosphazene molecules comprise organophosphorus compounds represented by the chemical formula:

wherein $X^1$, $X^2$, $X^3$, $X^4$, $X^5$, and $X^6$ are each individually a halide, an alkoxy group, or an amino group.

13. The electrochemical cell of claim 11, wherein the individual cyclophosphazene molecules comprise phenoxycyclophosphazene.

14. The electrochemical cell of claim 11, wherein the ceramic material particles comprise particles of alumina, silica, a dehydrated zeolite, or a combination thereof.

15. The electrochemical cell of claim 11, wherein the microporous layer comprises a polyolefin.

16. The electrochemical cell of claim 11, further comprising:
a liquid electrolyte comprising a lithium salt dissolved in a nonaqueous organic solvent, the liquid electrolyte infiltrating the pores of the composite separator and establishing a lithium-ion transport path between the negative electrode and the positive electrode,
wherein the ceramic material particles are disposed on at least one of the first side or the second side of the microporous layer such that interstitial voids exist between at least some of the ceramic material particles, and wherein the interstitial voids are infiltrated with the liquid electrolyte.

17. The electrochemical cell of claim 16,
wherein the cyclophosphazene molecules exhibit a solubility of, by mass, less than or equal to about 1% in the nonaqueous organic solvent.

18. A method of manufacturing a composite separator for an electrochemical cell that cycles lithium ions, the method comprising:
introducing cyclophosphazene molecules into interconnected open pores of ceramic material particles by immersing the ceramic material particles in a solution comprising the cyclophosphazene molecules and an organic solvent, the interconnected open pores of the ceramic material particles being sized to receive the cyclophosphazene molecules; and
depositing the ceramic material particles on at least one of a first side or an opposite second side of a microporous layer comprising a polyolefin.

19. The method of claim 18, wherein the cyclophosphazene molecules comprise phenoxycyclophosphazene and the ceramic material particles comprises lithium ion exchanged zeolite particles having pore diameters of greater than or equal to 2.6 Angstroms and less than or equal to 7 Angstroms.

20. The method of claim 19, wherein the ceramic material particles are deposited on at least one of the first side or the second side of the microporous layer prior to introducing the cyclophosphazene molecules into the interconnected open pores of the ceramic material particles, and wherein introducing the cyclophosphazene molecules into the interconnected open pores of the ceramic material particles comprises immersing the ceramic material particles and the microporous layer in the solution.

* * * * *